United States Patent
Baruch et al.

(10) Patent No.: US 9,990,305 B2
(45) Date of Patent: Jun. 5, 2018

(54) MEMORY MANAGEMENT COMPONENT HAVING MULTIPLE MEMORY MANAGEMENT MODULES AND METHOD THEREFOR

(71) Applicants: Nir Baruch, Tel-Aviv (IL); Nir Atzmon, Netanya (IL); David W. Todd, Austin, TX (US)

(72) Inventors: Nir Baruch, Tel-Aviv (IL); Nir Atzmon, Netanya (IL); David W. Todd, Austin, TX (US)

(73) Assignee: NXP USA, Inc., Austin, TX (US)

( * ) Notice: Subject to any disclaimer, the term of this patent is extended or adjusted under 35 U.S.C. 154(b) by 102 days.

(21) Appl. No.: 14/490,902

(22) Filed: Sep. 19, 2014

(65) Prior Publication Data
US 2016/0085687 A1    Mar. 24, 2016

(51) Int. Cl.
*G06F 12/1036* (2016.01)
*G06F 12/1009* (2016.01)
*G06F 12/14* (2006.01)

(52) U.S. Cl.
CPC ...... *G06F 12/1036* (2013.01); *G06F 12/1009* (2013.01); *G06F 12/1441* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 5,924,110 A * | 7/1999 | Pike | G06F 12/109 711/173 |
| 6,615,314 B1 * | 9/2003 | Higaki | G06F 3/061 711/114 |
| 2012/0233414 A1 * | 9/2012 | Meier | G06F 9/342 711/154 |
| 2013/0013889 A1 * | 1/2013 | Devaraj | G06F 12/1483 711/207 |
| 2015/0089180 A1 * | 3/2015 | Yamamura | G06F 12/1441 711/170 |
| 2015/0256484 A1 * | 9/2015 | Cameron | G06F 9/3004 709/226 |

FOREIGN PATENT DOCUMENTS

WO    2011008702 A1    1/2011

* cited by examiner

*Primary Examiner* — Midys Rojas
*Assistant Examiner* — Charles J Choi

(57) ABSTRACT

A memory management component arranged to receive memory access transactions and provide memory management functionality therefor, and a method of providing memory management functionality within a processing system are disclosed. The memory management component comprises a first memory management module arranged to provide memory management functionality for received memory access transactions in accordance with a paging memory management scheme, and at least one further memory management module arranged to provide memory management functionality for received memory access transactions in accordance with an address range memory management scheme.

20 Claims, 7 Drawing Sheets

MEMORY MANAGEMENT COMPONENT HAVING MULTIPLE MEMORY MANAGEMENT MODULES AND METHOD THEREFOR

FIELD OF THE INVENTION

This invention relates to a memory management component, and a method of providing memory management functionality within a processing system.

BACKGROUND OF THE INVENTION

Memory management Units (MMUs) are used in microcontrollers, network processors and other types of microprocessors, and are components through which memory access transactions are passed in order to provide, for example, translation from virtual memory addresses to physical memory addresses. In addition, MMUs are often implemented to provide memory protection to prevent access to certain (protected) regions of memory being accessed by unauthorised processes and/or components within the microprocessor or the computer processing system in which the microprocessor is implemented.

Paging is a memory management scheme by which data may be stored to and retrieved from secondary memory for use in main memory. In a paging memory management scheme, an operating system retrieves data from secondary memory in same-size blocks called pages. Paging allows the physical address space of a process to be non-contiguous. Before paging came into use, systems had to fit whole programs into storage contiguously, which caused various storage and fragmentation problems. Paging is an important part of virtual memory implementations in contemporary general-purpose operating systems, allowing them to use secondary memory for data that does not fit into physical random-access memory (RAM). Furthermore, paging enables the benefit of page-level protection whereby user-level processes can be limited to seeing and modifying data which is paged in to their own address space, providing hardware isolation. System pages can also be protected from user processes.

Modern MMUs typically use a page table to store the mapping between virtual addresses and physical addresses. The page table comprises one page table entry (PTE) per page, and is typically stored within memory. In order to improve virtual address translation speed, it is known for MMUs to use a translation lookaside buffer (TLB). A TLB typically comprises an associative cache of PTEs, and typically contains a subset of the PTEs within the TLB. The TLB may comprise recently accessed and/or regularly accessed PTEs, or contain PTEs according to any other PTE caching strategy. In this manner, the translation speed between virtual addresses corresponding to PTEs within the TLB may be significantly reduced since they are cached and readily available. If a translation from a virtual address corresponding to a PTE not within the TLB is required, then the full page table stored within memory is required to be referenced, which is a significantly slower process than simply referencing the cached TLB.

A typical state of the art MMU implementation, such as the ARM™ System Memory Management Unit (SMMU), has the following characteristics:

A low page granularity (e.g. 4 KB, 64 KB, 512 MB, 1 TB);
A bypass mechanism based on, for example, a stream ID;
General MMU features such as address translation, memory protection, etc.

A problem with such state of the art MMU implementations occurs when, for example, a master device (e.g. a processing core) comprises a large private area of memory, for example 256 MB. In a typical implementation comprising page sizes of, say, 64 KB, 4096 PTEs are required for the large private area of memory for the master device. Typical MMU implementations only support 128 PTEs within their TLB. Because of this, when the master device attempts to access its private area, the likelihood of the address being present in the TLB is small (128/4096). Thus, a high page miss rate (97%) will occur when the master device attempts to access its private area, which will have a significant impact on the performance of the system.

Although the bypass mechanism may be used to allow the page checking feature to be bypassed (and thus bypass the need to reference the page table stored in memory), this would result in no protection of the master device's private area of memory.

SUMMARY OF THE INVENTION

The present invention provides a memory management component, a microprocessor, a processing system and a method of providing memory management functionality within a processing system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

The present invention will now be described with reference to the accompanying drawings. However, it will be appreciated that the present invention is not limited to the specific examples herein described and as illustrated in the accompanying drawings, and various modifications and variations may be made without detracting from the inventive concept. Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Figure 1:
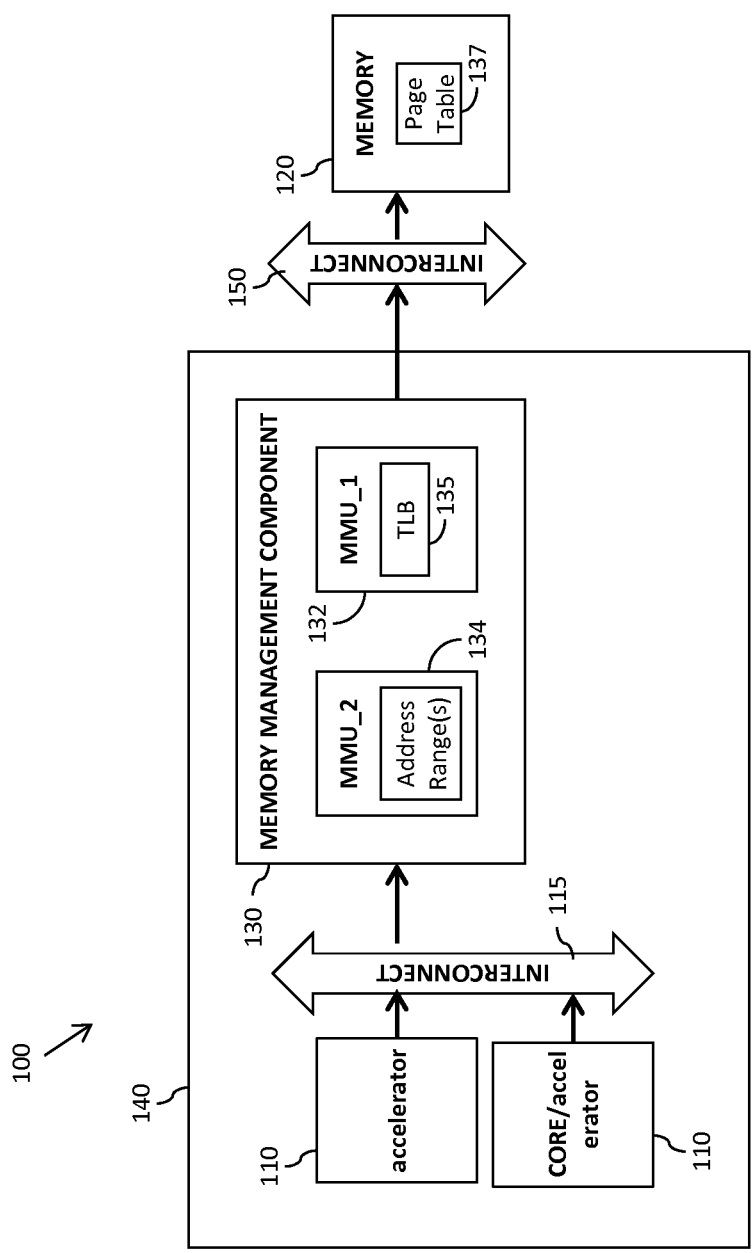
FIG. 1 illustrates a simplified block diagram of an example of a processing system.

Referring now to FIG. 1 there is illustrated a simplified block diagram of an example of a processing system 100. The processing system 100 comprises one or more master devices 110 arranged to access data etc. stored within one or more secondary memory elements 120. Such master devices 110 may comprise, for example, one or more processing cores, one or more direct memory access (DMA) controller components, and other hardware accelerators etc. The processing system 100 further comprises one or more memory management components, such as the memory management component 130 illustrated in FIG. 1. The (or each) memory management component 130 may be implemented within an integrated circuit device comprising at least one die within a single integrated circuit package, and is arranged to receive memory access transactions, such as read and/or write transactions, from one or more master device(s), for example by way of one or more interconnect components 115, and to provide memory management functionality therefor. Such memory management functionality may comprise, by way of example, address translation functionality, memory protection functionality, etc. The (or each) memory management component 130 is further arranged to forward memory access transactions to their respective destinations, such as the memory element 120 illustrated in FIG. 1, for example by way of one or more interconnect components 150. In the example illustrated in FIG. 1, the memory management component 130 is implemented as an integral part of a microprocessor integrated circuit (IC) 140, along with the processing core 110. Such a microprocessor integrated circuit device 140 may comprise, for example, a general purpose microprocessor (CPU) IC, a microcontroller component (MCU) IC, a network processor (MPU) IC, a digital signal processor (DSP) IC or other type of microprocessor integrated circuit. However, it will be appreciated that in other examples the memory management component 130 may equally be implemented within a separate IC, or integrated within an interconnect component 150 which connects e.g. a microprocessor integrated circuit device 140 to an external memory component 120 as shown.

In the illustrated example, the memory management component 130 comprises a first memory management module 132 arranged to provide memory management functionality for received memory access transactions in accordance with a paging memory management scheme. As previously mentioned, paging is a memory management scheme by which data may be stored to and retrieved from secondary memory (e.g. memory 120 in FIG. 1) for use in main memory (e.g. RAM or cache, not shown) in pages of a fixed/preconfigured size. Such a paging memory management scheme advantageously enables the physical address space of a process to be non-contiguous, allows secondary memory to be used to supplement physical random-access memory (RAM) for data that does not fit into the physical RAM, enables the benefit of page-level protection, etc. As will be appreciated by a skilled artisan, such a paging memory management scheme is an important feature within modern processing systems.

In the example illustrated in FIG. 1, the first memory management module 132 may be arranged to use a page table 137 to store the mapping between virtual addresses and physical addresses (and/or between virtual addresses and intermediate addresses and/or between intermediate addresses and physical addresses), along with memory protection parameters etc. Such a page table 137 may comprise one page table entry (PTE) per page, and may be stored within the memory element 120. In order to improve virtual address translation speed, the first memory management module 132 may comprise a translation lookaside buffer (TLB) 135. The TLB 135 may comprise an associative cache of PTEs, and may contain a subset of the PTEs within the TLB 135. The TLB 135 may comprise recently accessed and/or regularly accessed PTEs, or contain PTEs according to any other PTE caching strategy. In this manner, the translation speed between virtual addresses corresponding to PTEs within the TLB 135 may be significantly reduced since they are cached and readily available. If a translation from a virtual address corresponding to a PTE not within the TLB 135 is required, then the full page table 137 stored within the memory element 120 may be referenced. The first memory management module 132 may comprise a page granularity of, for example, 4 KB, 64 KB, 512 MB, 1 TB, etc. In some example the page granularity of the first memory management module 132 may be configurable.

As identified in the background of the invention, a problem with such paging memory management schemes occurs when, for example, a master device/process (e.g. a particular process executing on, say, a hardware accelerator 110) is assigned a large private area of memory, for example 256 MB. In a typical implementation comprising page sizes of, say, 64 KB, 4096 PTEs are required for the large private area of memory for the master device/process. Typical MMU implementations only support 128 PTEs within their TLB. Because of this, when the master device/process attempts to access its private area, the likelihood of the address being present in the TLB is small (128/4096). Thus, a high page miss rate (e.g. ~97%) will occur when the master device/process attempts to access its private area, which will have a significant impact on the performance of the overall system when the master device/process frequently attempts to access its private area.

However, in the example illustrated in FIG. 1, the memory management component 130 further comprises a further memory management module 134 arranged to provide memory management functionality for received memory access transactions in accordance with an address range memory management scheme (as opposed to the paging memory management scheme of the first memory management module 132). For example, the further memory management module 134 may comprise one or more memory elements in which at least one address range may be defined, and as described in greater detail below in relation to some examples may be arranged to implement memory protection for the at least one address range.

In this manner, when a large private area of memory is assigned to a particular master device/process, the address range for said private area of memory may be defined within the further memory management module 134, enabling the further memory management module 134 to provide memory protection therefor, instead of the first memory management module 132. As such, memory management functionality (and in particular memory protection functionality in some examples) may be provided for memory access transactions from a master device/process to a private address range whilst bypassing the paging memory management scheme of the first memory management module 132. Advantageously, because such an address range is able to cover substantially any size of contiguous area of memory, such an address range memory management scheme does not suffer from the same problem of having to manage a large number of page table entries when providing protection for a large contiguous area of memory, and specifically from the low likelihood of a target address of a received memory access transaction being present in a cached TLB, and thus of a high page miss rate occurring resulting in the need for frequent time consuming page table accesses when such a master device/process attempts to access its private area of memory. As a consequence, overall system performance may be improved, and in particular of such a master device/process accessing its private area of memory.

Significantly, implementation of such an address range memory management scheme may be achieved in a simple and low cast manner, whilst reducing the page miss rate for memory access transactions from the master device/process to its private area of memory from (in the example described above) 97% to 0%.

Furthermore, by providing such a further memory management module arranged to provide memory management functionality in accordance with an address range memory management scheme along with a first memory management module arranged to provide memory management functionality in accordance with a paging memory management scheme, the paging memory management functionality may be retained for memory access transactions other than those from the master device/process to its private area of memory.

In some examples, the first memory management module 132 arranged to provide memory management functionality for received memory access transactions in accordance with a paging memory management scheme may be implemented using a conventional memory management component silicon IP (intellectual property) block. In this manner, the need for costly and time consuming redesign of a complete memory management functional block providing paged memory management may be avoided.

Figure 2:
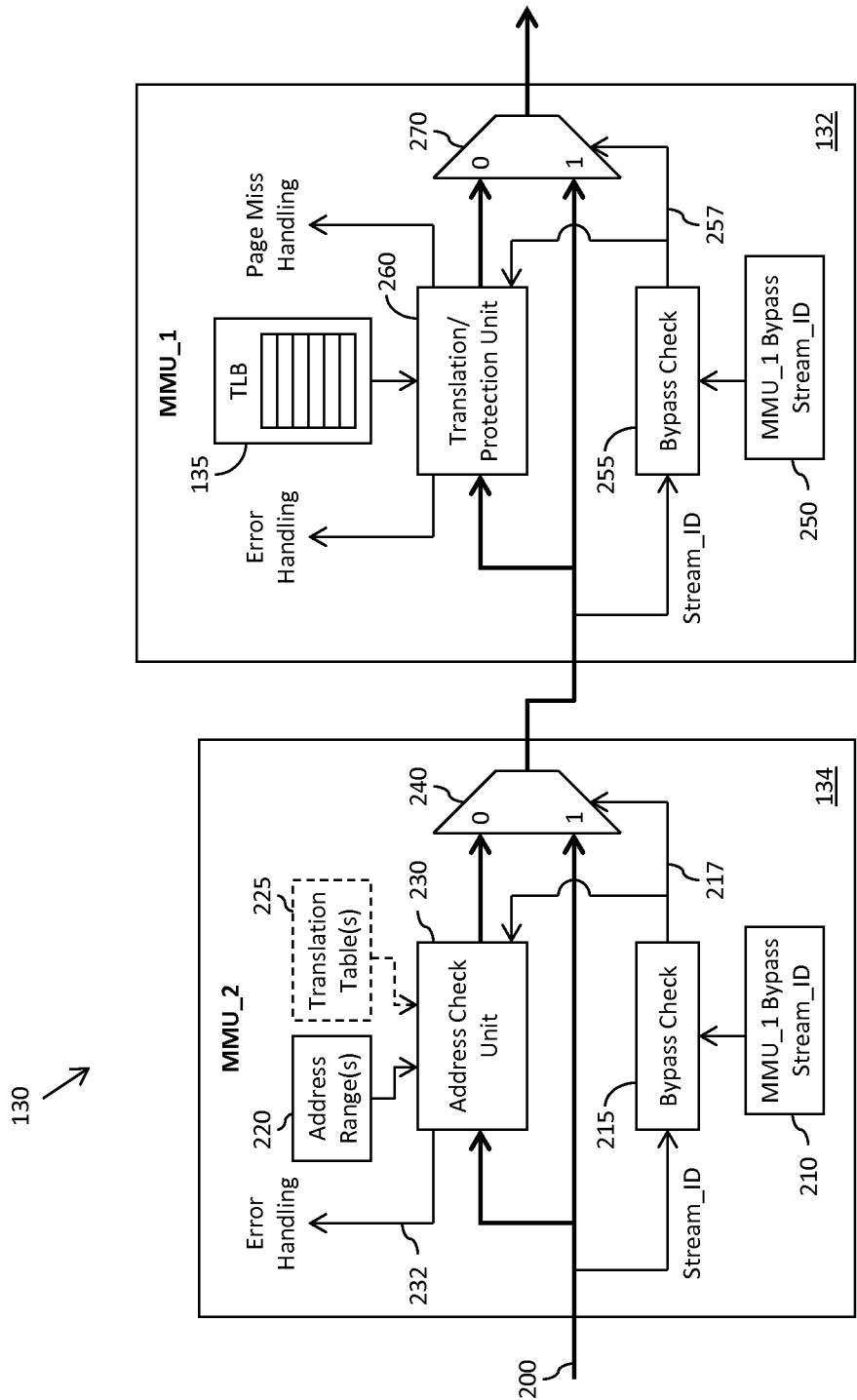
FIG. 2 illustrates a simplified block diagram of an example of a memory management component of FIG. 1

Referring now to FIG. 2, there is illustrated a simplified block diagram of a first example of the memory management component 130 of FIG. 1. In the example illustrated in FIG. 2, the first and further memory management modules 132, 134 are arranged in series. In particular in the illustrated example of FIG. 2, memory access transactions received at an input 200 of the memory management component 130 are first provided to the further memory management module 134 arranged to provide memory management functionality in accordance with an address range memory management scheme.

The further memory management module 134 is arranged to compare at least one sideband signal corresponding to received memory access transactions to at least one predefined parameter to identify memory access transactions for which memory management functionality is to be provided based at least partly on the comparison of the sideband signal(s) to the predefined parameter(s). In the illustrated example, the further memory management module 134 comprises at least a first memory element 210 within which the predefined parameter(s) is(are) stored. In the illustrated example, the sideband signal which the further memory management module 134 is arranged to compare the predefined parameter comprises, say, a stream ID signal. A stream ID is typically used to map an incoming memory access transaction to a context, enabling a particular context to which the incoming memory access transaction relates to be identified. As such, one or more stream IDs for identifying one or more contexts relating to memory access transactions from one or more master device(s)/process(es) to its/their respective private area(s) of memory may be stored within the first memory element 210. A bypass check component 215 of the further memory management module 134 is arranged to compare stream IDs within the sideband information for received memory access transactions to those stored within the first memory element 210. In some examples, if a stream ID match occurs, the bypass check component 215 is arranged to enable the memory management functionality of the further memory management module 134 for the corresponding memory access transaction. Conversely, if no stream ID match occurs then the bypass check component 215 is arranged to enable a bypass mode of the further memory management module 134. For example, in the illustrated example the bypass check component 215 is arranged to output a bypass signal 217 indicating whether the further memory management module 134 is in the bypass mode of operation (e.g. by setting bypass signal 217 to '1') or not (e.g. by setting bypass signal 217 to '0').

In this manner, the further management module 134 is arranged to provide memory management functionality in relation to memory access transactions for which the respective stream IDs match the predefined stream IDs stored in the first memory element 210, and to cause the memory management functionality provided thereby to be bypassed for memory access transactions for which the respective stream IDs do not match the predefined stream IDs stored in the first memory element 210.

In the example illustrated in FIG. 2, the memory management functionality provided by the further memory management module 134 to a received memory access transaction comprises determining whether a target address of the received memory access transaction corresponds to one or more predefined address range. In the illustrated example, the further memory management module 134 comprises a further memory element 220 within which parameters for defining one or more address ranges may be stored. Such parameters may comprise, say, a start and end address for each address range, or one of a start and end address and an address range size indication for each address range. In the illustrated example, two separate memory elements 210, 220 have been illustrated and described for clarity and ease of understanding. However, it will be appreciated that the two memory elements 210, 220 may be implemented by way of a single physical memory component, for example by way of a single block of registers or other suitable memory component(s).

The memory management functionality provided by the further memory management module 134 may comprise generating an error interrupt if the target address of a received memory access transaction is not within a predefined address range. In the illustrated example, the further memory management module 134 further comprises an address check component 230 arranged to receive memory access transactions, and compare target addresses for the received memory access transaction to the, or each, address range defined within the further memory element 220. If the target address of a received memory access transaction is not within a predefined address range then the address check component 230 may generate an error interrupt 232. Conversely, if the target address of a received memory access transaction is within a defined address range, then the address check component 230 is arranged to permit the memory access transaction, and the received memory access transaction is forwarded on.

In the illustrated example, the address check component 230 is arranged to receive the bypass signal 217 output by the bypass check component 215 and may be arranged to enable/disable the memory management functionality provided thereby (e.g. the address checking functionality), or simply to enable/disable the generation of error interrupts, in accordance with the bypass signal 217. In this manner, when the bypass check component 215 is arranged to enable a bypass mode of the further memory management module 134 by setting the bypass signal 217 accordingly, the address check component 230 may be arranged to disable the memory management functionality provided thereby (e.g. the address checking functionality), or simply to disable the generation of error interrupts. In this manner, the generation of error interrupts by the further memory management module 134 when operating in a bypass mode of operation may be prevented.

In some examples, the address check component 230 may further be arranged to perform address translation of target addresses of received memory access transactions. For example, the address check component 230 may be operably coupled to a still further memory element 225 comprising one or more translation tables comprising one or more address translation descriptors for translating target virtual addresses (or target intermediate addresses) of received memory access transactions to physical addresses (or intermediate addresses). In this manner, upon receipt of a memory access transaction comprising a target address corresponding to at least one predefined address range, the address check component 230 may be arranged to translate the target address of the received memory access transaction and to update the target address with the translated address, and to forward on the memory access transaction comprising the translated address.

In the illustrated example, the further memory management module 134 further comprises a multiplexer component 240 arranged to receive memory access transactions directly from the input 200 of the further memory management module 134 at a first input thereof, and memory access transactions forwarded on by the address check component 230 at a second input thereof. The multiplexer component 240 is further arranged to receive at a control input thereof the bypass signal 217 output by the bypass check component 215 and to selectively output memory access transactions received at one of its inputs based on the bypass signal 217. In particular, the multiplexer component 240 may be arranged to output memory access transactions received at its first input directly from the input 200 of the further memory management module 134 when the bypass signal 217 indicates that the further memory management module 134 is operating in a bypass mode, and to output memory access transactions received at its second input forwarded on from the address check component 230 when the bypass signal 217 indicates that the further memory management module 134 is not operating in a bypass mode.

In the example illustrated in FIG. 2, the memory access transactions output by the multiplexer component 240 are then provided to the first memory management module 132 arranged to provide memory management functionality for received memory access transactions in accordance with a paging memory management scheme.

The first memory management module 132 is arranged to compare at least one sideband signal corresponding to received memory access transactions to at least one predefined parameter to identify memory access transactions for which memory management functionality is to be bypassed based at least partly on the comparison of the sideband signal(s) to the predefined parameter(s). In the illustrated example, the first memory management module 132 comprises at least a first memory element 250 within which the predefined parameter(s) is(are) stored. In the illustrated example, the sideband signal which the first memory management module 132 is arranged to compare the predefined parameter comprises, say, a stream ID signal. As such, one or more stream IDs for identifying one or more contexts relating to memory access transactions from one or more master device(s)/process(es) to its/their respective private area(s) of memory may be stored within the first memory element 250. A bypass check component 255 of the first memory management module 132 is arranged to compare stream IDs within the sideband information for received memory access transactions to those stored within the first memory element 250. In some examples, if a stream ID match occurs, the bypass check component 255 is arranged to disable the memory management functionality of the first memory management module 132 for the corresponding memory access transaction, for example, by outputting a bypass signal 257 indicating that the further memory management module 134 is in a bypass mode of operation. Conversely, if no stream ID match occurs then the bypass check component 255 is arranged to enable the memory management functionality of the first memory management module 132 for the corresponding memory access transaction, for example, by outputting a bypass signal 257 indicating that the further memory management module 134 is not in a bypass mode of operation.

In this manner, the first management module 132 is arranged to provide memory management functionality in relation to memory access transactions for which the respective stream IDs do not match the predefined stream IDs stored in the first memory element 250, and to cause the memory management functionality provided thereby to be bypassed for memory access transactions for which the respective stream IDs do match the predefined stream IDs stored in the first memory element 250

In the illustrated example, the first memory management module 132 comprises a translation/protection component 260 for providing memory management functionality for the first memory management module 132. The translation/protection component 260 is arranged to receive memory access transactions, and compare target addresses for the received memory access transaction to page table entries (PTEs) within the TLB 135. If the target address of a received memory access transaction corresponds to a PTE within the TLB 135, the translation/protection component 260 performs address translation and protection checks in accordance with the PTE within the TLB 135 to which the target address corresponds. However, if the TLB does not comprise a PTE to which the target address of a received memory access transaction corresponds, a page miss occurs and the translation/protection component 260 is required to retrieve the relevant PTE from the page table 137 stored within memory 120 (FIG. 1). Having retrieved the relevant PTE, the translation/protection component 260 performs address translation and protection checks in accordance with the retrieved PTE. Having performed the necessary address translation and protection checks for a received memory access transaction, the received memory access transaction is forwarded on.

In the illustrated example, the translation/protection component 260 is arranged to receive the bypass signal 257 output by the bypass check component 255 and may be arranged to enable/disable the memory management functionality provided thereby (e.g. the address translation and checking functionality, in accordance with the bypass signal 257. In this manner, when the bypass check component 255 is arranged to enable a bypass mode of the first memory management module 132 by setting the bypass signal 257 accordingly, the translation/protection component 260 may be arranged to disable the memory management functionality provided thereby. In this manner, the generation of error interrupts by the first memory management module 132 when operating in a bypass mode of operation may be prevented.

In the illustrated example, the first memory management module 132 further comprises a multiplexer component 270 arranged to receive memory access transactions directly from the further memory management module 134 at a first input thereof, and memory access transactions forwarded on by the translation/protection component 260 at a second input thereof. The multiplexer component 270 is further arranged to receive at a control input thereof the bypass signal 257 output by the bypass check component 255 and to selectively output memory access transactions received at one of its inputs based on the bypass signal 257. In particular, the multiplexer component 270 may be arranged to output memory access transactions received at its first input directly from the further memory management module 134 when the bypass signal 257 indicates that the first memory management module 132 is operating in a bypass mode, and to output memory access transactions received at its second input forwarded on from the translation/protection component 260 when the bypass signal 257 indicates that the first memory management module 132 is not operating in a bypass mode.

In the example illustrated in FIG. 2, the memory access transactions output by the multiplexer component 270 are then forwarded on to an intended destination for executing the necessary memory access.

Accordingly, a memory management component 130 has been described comprising a first memory management module 132 and at least one further memory management module 134 that may be configured such that the first memory management module 132 is arranged to provide memory management functionality in accordance with a paging memory management scheme for memory access transactions comprising sideband signals that do not match a predefined context parameter (e.g. stream ID); and the at least one further memory management module 134 is arranged to provide memory management functionality in accordance with an address range memory management scheme for memory access transactions comprising sideband signals that match a predefined context parameter (e.g. stream ID). In particular, it is contemplated that the further memory management module 134 may be configured to provide memory management functionality for memory access transaction comprising sideband signals indicating a memory access transaction from a master device/process to a private area of memory of the master device.

In this manner, when a large private area of memory is assigned to a particular master device/process, the address range for said private area of memory may be defined within the further memory management module 134, enabling the further memory management module 134 to provide memory protection therefor, instead of the first memory management module 132. As such, memory management functionality may be provided for memory access transactions from a master device/process to a private address range whilst bypassing the paging memory management scheme of the first memory management module 132. As previously mentioned, because such an address range is able to cover substantially any size of contiguous area of memory, such an address range memory management scheme does not suffer from the problem of having to manage a large number of page table entries when providing protection for a large contiguous area of memory, and specifically from the low likelihood of a target address of a received memory access transaction being present in a cached TLB, and thus of a high page miss rate occurring resulting in the need for frequent time consuming page table accesses when such a master device/process attempts to access its private area of memory. As a consequence, overall system performance may be improved, and in particular of such a master device/process accessing its private area of memory.

Significantly, by providing the further memory management module 134 arranged to provide memory management functionality in accordance with an address range memory management scheme along with the first memory management module 132 arranged to provide memory management functionality in accordance with a paging memory management scheme, the paging memory management functionality may be retained for memory access transactions other than those from the master device/process to its private area of memory.

It will be appreciated that the order of the memory management modules 132, 134 in FIG. 2 is only exemplary, and it is contemplated that their order may be reversed such that the first memory management module 132 precedes the further memory management module 134.

Figure 3:
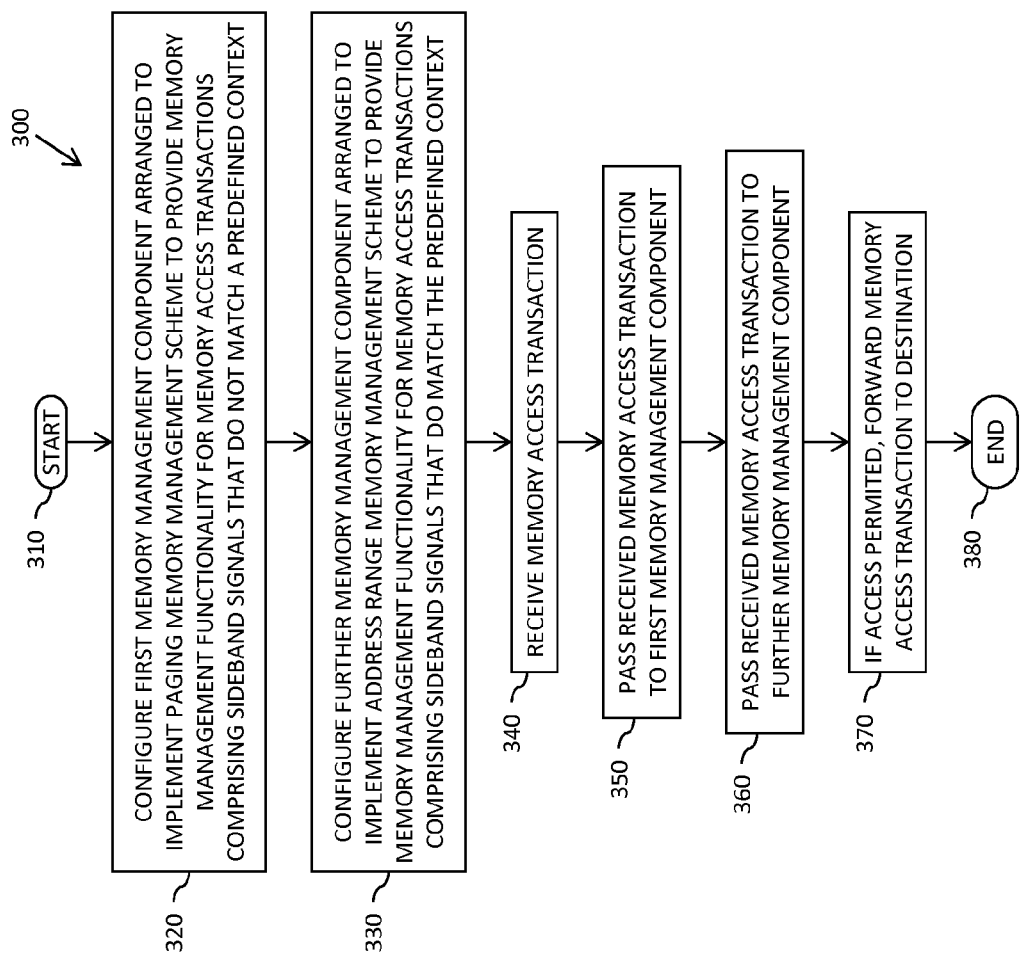
FIGS. 3 to 5 illustrate simplified flowcharts of an example of a method of providing memory management functionality within a processing system.
Figure 4:
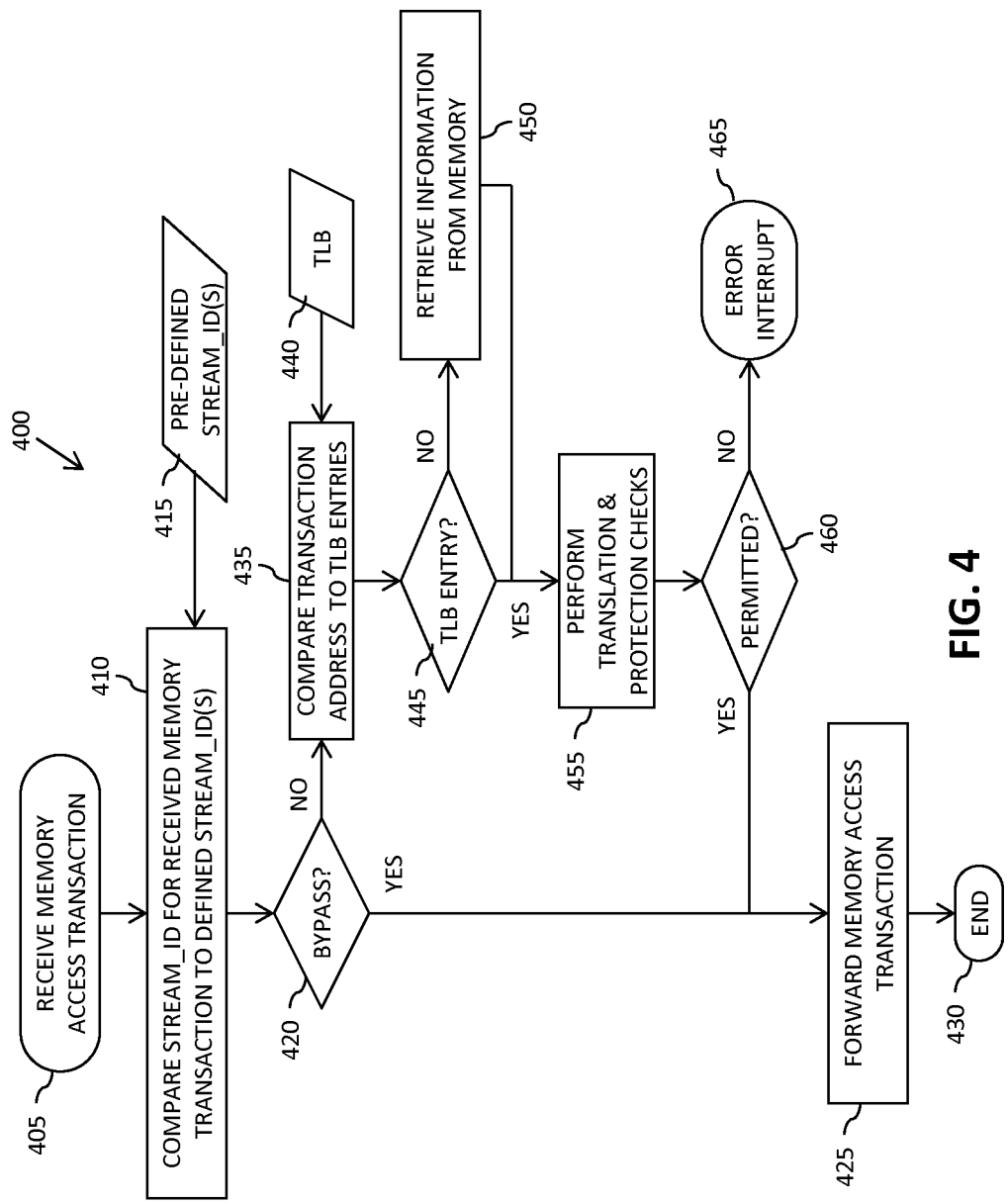
Figure 5:
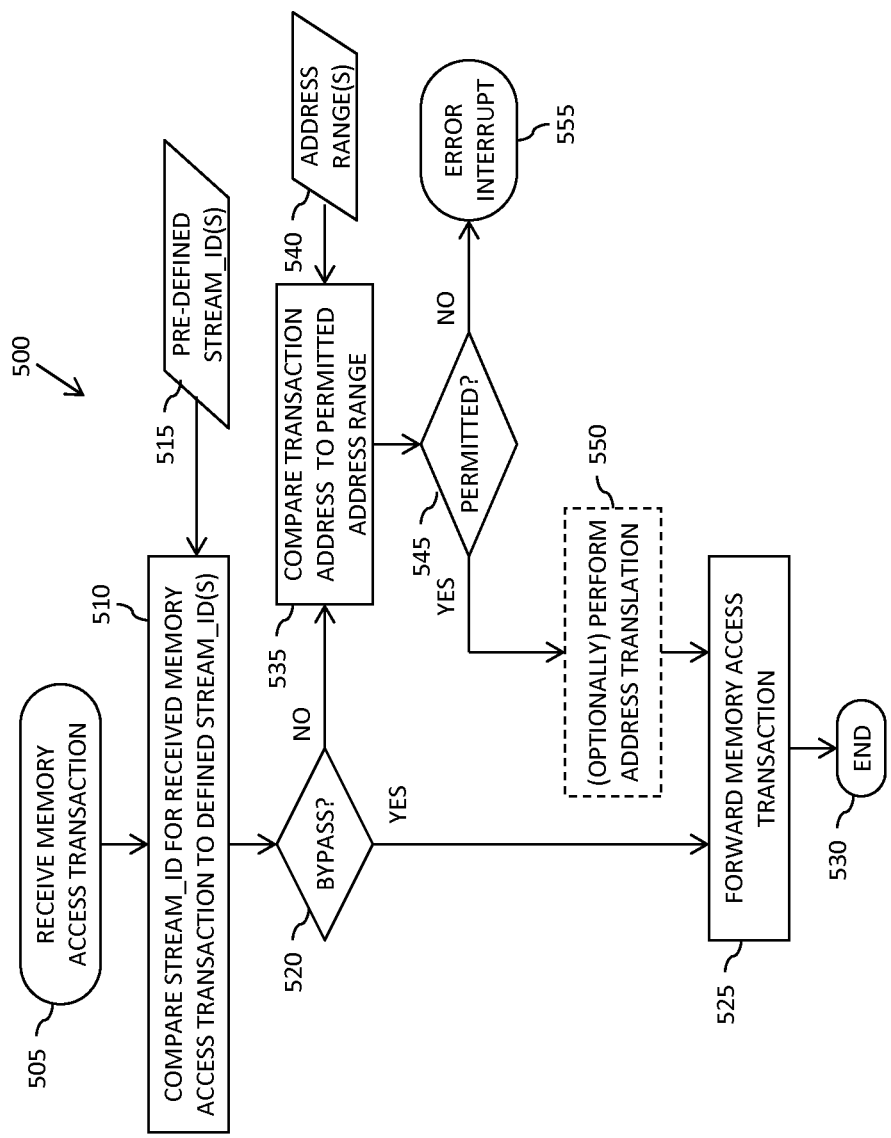

Referring now to FIGS. 3 to 5 there are illustrated simplified flowcharts 300, 400, 500 of an example of a method of providing memory management functionality within a processing system. The method illustrated in FIGS. 3 to 5 starts at 310 in the flowchart 300 of FIG. 3, and moves on to 320 where a first memory management module arranged to provide memory management functionality for received memory access transactions in accordance with a paging memory management scheme (such as the memory management component 132 in FIGS. 1 and 2) is configured to provide memory management functionality for memory access transactions comprising sideband signals that do not match a predefined context. Next, at 330, at least one further memory management module arranged to provide memory management functionality for received memory access transactions in accordance with an address range memory management scheme (such as the memory management component 134 in FIGS. 1 and 2) is configured to provide memory management functionality for memory access transactions comprising sideband signals that match the predefined context. It will be appreciated that steps 32 and 330 may equally be performed in the reverse order to that illustrated in FIG. 3, or substantially simultaneously. The method then moves on to 340 where a memory access transaction is subsequently received. The received transaction is then provided to the first memory management module at 350 and then to the further memory management module at 360. In some alternative examples, steps 350 and 360 may be performed in the opposite order. If access is permitted (e.g. if neither the first or further memory management modules generate an error interrupt), the memory access transaction is forwarded on to its intended destination at 370 and the method ends at 380.

FIG. 4 illustrates an example of a part of the method performed by the first memory management module. This part of the method starts at 405 with receipt of a memory access transaction by the first memory management module. Next, at 410, a stream ID for the received memory access transaction (defining a context to which the memory access transaction corresponds) is compared with one or more predefined stream IDs 415 (or other predefined context parameter(s)), at 410. Next, at 420, it is determined whether the memory management functionality of the first memory management module is to be bypassed for the received memory access transaction, based on the comparison of the stream ID therefor. For example, if the stream ID for the received memory access transaction matches one or more of the predefined stream IDs, it may be determined that the received memory access transaction corresponds to a context for which the further memory management module is to provide memory management functionality, and thus that the memory management functionality of the first memory management module is to be bypassed for the received memory access transaction. If it is determined that the memory management functionality of the first memory management module is to be bypassed for the received memory access transaction, the method moves on to 425 where in the illustrated example the received memory access transaction is forwarded on to the further memory management module, and this part of the method ends at 430. Conversely, if it is determined that the memory management functionality of the first memory management module is not to be bypassed for the received memory access transaction, the method moves on to 435, where a target address of the received memory management transaction is compared to page table entries (PTEs) within the translation lookaside buffer (TLB) 440. If the target address corresponds to a PTE within the TLB, at 445, the method moves on to 455 where translation and protection checks are performed in accordance with the PTE to which the target address corresponds. However, if the target address does not correspond to any of the PTEs within the TLB at 445, the method moves on to 450 where the appropriate PTE is retrieved from memory. Once the required PTE has been retrieved, the method then moves on to 455 where translation and protection checks are performed. Having performed the translation and protection checks, if it is determined that the memory access is permitted, at 460, the method moves on to 425, where the memory access transaction is forwarded on to the further memory management module, and this part of the method ends. Conversely, if it is determined that the memory access should not be permitted, then the method moves on to 465 where an error interrupt is generated, and at least this part of the method ends.

FIG. 5 illustrates an example of a part of the method performed by the further memory management module. This part of the method starts at 505 with receipt of a memory access transaction by the further memory management module. Next, at 510, a stream ID for the received memory access transaction (defining a context to which the memory access transaction corresponds) is compared with one or more predefined stream IDs 515 (or other predefined context parameter(s)), at 510. Next, at 520, it is determined whether the memory management functionality of the further memory management module is to be bypassed for the received memory access transaction, based on the comparison of the stream ID therefor. For example, if the stream ID for the received memory access transaction matches one or more of the predefined stream IDs, it may be determined that the received memory access transaction corresponds to a context for which the further memory management module is to provide memory management functionality, and thus that the memory management functionality of the further memory management module is not to be bypassed for the received memory access transaction. If it is determined that the memory management functionality of the further memory management module is to be bypassed for the received memory access transaction, the method moves on to 525 where in the illustrated example the received memory access transaction is forwarded on to its intended destination, and this part of the method ends at 530. Conversely, if it is determined that the memory management functionality of the further memory management module is not to be bypassed for the received memory access transaction, the method moves on to 535, where a target address of the received memory management transaction is compared to one or more predefined address ranges 540. If the target address corresponds to a predefined address range, at 545, it may be determined that the memory access is permitted and the method moves on to 525, where the memory access transaction is forwarded on to its intended destination, and this part of the method ends at 530. Conversely, if it is determined that the memory access should not be permitted, then the method moves on to 555 where an error interrupt is generated, and at least this part of the method ends. In some examples, it is contemplated that the method may optionally also comprise performing address translation for the received memory access transaction, for example as illustrated at 550.

Figure 6:
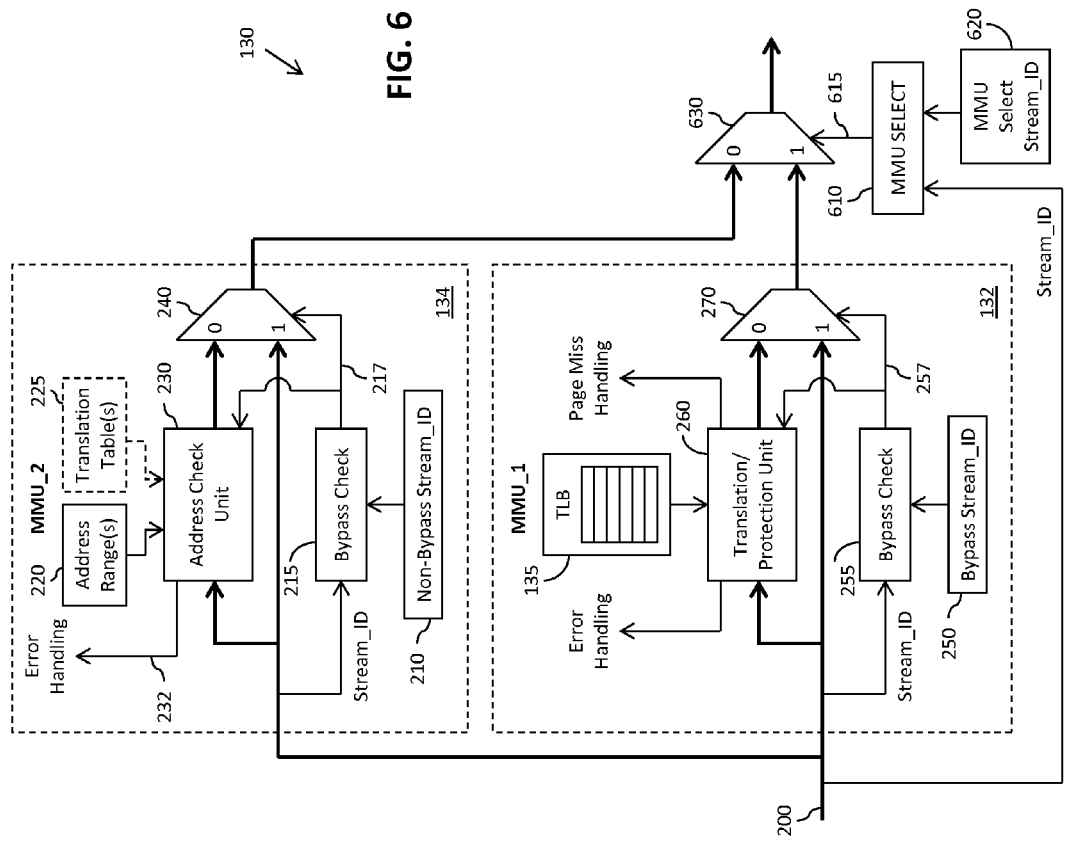
FIG. 6 illustrates a simplified block diagram of an alternative example of a memory management component of FIG. 1

Referring now to FIG. 6, there is illustrated a simplified block diagram of an alternative example of the memory management component 130 of FIG. 1. In the example illustrated in FIG. 6, the first and further memory management modules 132, 134 are arranged in parallel. In this manner, memory access transactions received at an input 200 of the memory management component 130 are provided substantially simultaneously to both the first memory management module 132 and the further memory management module 134.

In the example illustrated in FIG. 6, the memory management component 130 further comprises a memory management module select component 610 arranged to compare stream IDs within the sideband information for received memory access transactions to those stored within a memory element 620, and to output a memory management module select signal 615 in response to the comparison. In the illustrated example, the memory management component 130 further comprises a multiplexer component 630 arranged to receive memory access transactions forwarded on by the first memory management module 132 at a first input thereof, and memory access transactions forwarded on by the further memory management module 134 at a second input thereof. The multiplexer component 630 is further arranged to receive at a control input thereof the memory management module select signal 615 and to selectively output memory access transactions received at one of its inputs based on the memory management module select signal 615. In some examples, the memory management module select component 610 and the multiplexer component 630 may be arranged such when a stream ID match does not occur, the multiplexer component 630 is caused to selectively output memory access transactions forwarded on by the first memory management module 132 received at its first input. Conversely, the memory management module select component 610 and the multiplexer component 630 may be arranged such when a stream ID match does occur, the multiplexer component 630 is caused to selectively output memory access transactions forwarded on by the further memory management module 134 received at its second input.

It will be appreciated that the error interrupt signals generated by the memory management modules 132, 134 may also be multiplexed in a similar manner to the outputs of the multiplexer components 240, 270.

In the examples illustrated in FIGS. 2 and 6, separate memory elements 210, 250, 615 have been illustrated and described for storing reference stream IDs. It will be appreciated that in some examples these memory elements may be implemented as a single memory element in which one or more predefined common reference stream ID(s) may be stored and mutually accessed.

Figure 7:
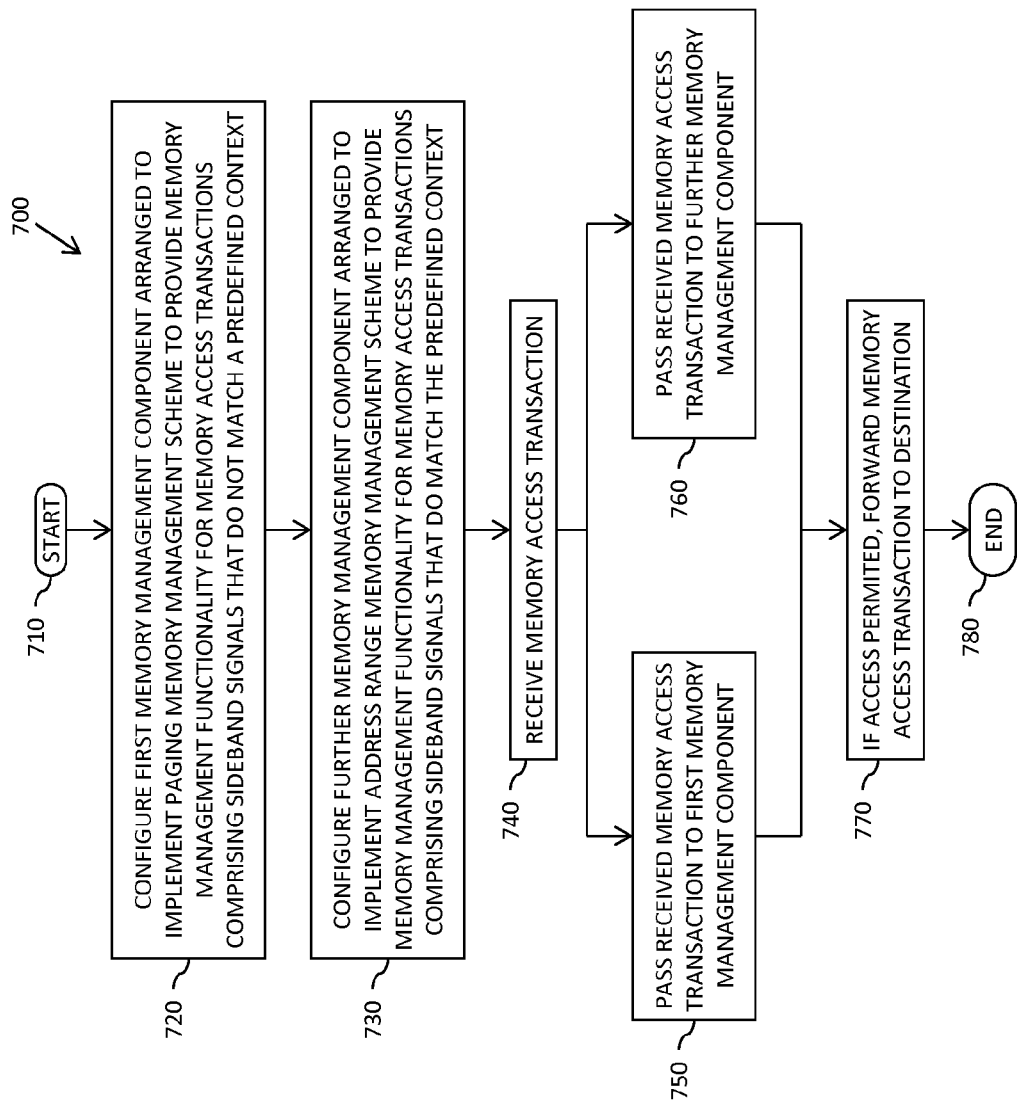
FIG. 7 illustrates a simplified flowchart of an alternative example of a method of providing memory management functionality within a processing system.

Referring now to FIG. 7, there is illustrated a simplified flowchart of an alternative example of a method of providing memory management functionality within a processing system. The method illustrated in FIG. 7 starts at 710 and moves on to 720 where a first memory management module arranged to provide memory management functionality for received memory access transactions in accordance with a paging memory management scheme (such as the memory management component 132 in FIG. 6) is configured to provide memory management functionality for memory access transactions comprising sideband signals that do not match a predefined context. Next, at 730, at least one further memory management module arranged to provide memory management functionality for received memory access transactions in accordance with an address range memory management scheme (such as the memory management component 134 in FIG. 6) is configured to provide memory management functionality for memory access transactions comprising sideband signals that match the predefined context. The method then moves on to 740 where a memory access transaction is subsequently received. The received transaction is then provided to the first memory management module at step 750 and (substantially simultaneously) to the further memory management module at 760. If access is, the memory access transaction is forwarded on to its intended destination at 770 and the method ends at 780.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

For example, although in FIG. 1 the secondary memory is shown as an external memory 120, external to the microprocessor, the secondary memory may likewise be part of the same integrated circuit. For instance the secondary memory may be on-chip non-volatile memory (such as on-chip flash memory) of a microcontroller or other type of microprocessor with on-chip non-volatile memory.

The connections as discussed herein may be any type of connection suitable to transfer signals from or to the respective nodes, components or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the first and further memory management modules 132, 134 may be implemented within a single semiconductor die. Alternatively, the examples may be implemented as any number of separate integrated circuits or separate devices interconnected with each other in a suitable manner. For example, the first and further memory management modules 132, 134 may be implemented within separate semiconductor dies.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A memory management component arranged to receive memory access transactions and provide memory management functionality therefor, the memory management component comprising:
   a first memory management module arranged to provide memory management functionality for received memory access transactions in accordance with a paging memory management scheme, wherein data is retrieved in same-size blocks; and
   at least one further memory management module arranged to provide memory management functionality for received memory access transactions in accordance with an address range memory management scheme, wherein the address range is for substantially any size memory area, the first memory management module and the at least one further memory management module being coupled together in series to provide memory access transactions between a single master device and a memory, wherein a memory access transaction having a stream identifier and the at least one further memory management module having a bypass mode, a memory access transaction bypassing the at least one further memory management module and being forwarded to the first memory management module in response to the stream identifier mismatching a predefined stream identifier.

2. The memory management component of claim 1, wherein the at least one further memory management module is arranged to:
   compare at least one sideband signal corresponding to received memory access transactions to at least one predefined parameter to identify memory access transactions for which memory management functionality provided thereby is to be provided based at least partly on the comparison of the at least one sideband signal corresponding to the received memory access transactions to the at least one predefined parameter; and
   provide memory management functionality in relation to identified memory access transactions.

3. The memory management component of claim 2, wherein the at least one sideband signal which the at least one further memory management module is arranged to compare to at least one predefined parameter comprises a context identifier signal corresponding to the received memory access transactions.

4. The memory management component of claim 2, wherein the at least one further memory management module comprises at least a first memory element within which the at least one predefined parameter is stored.

5. The memory management component of claim 2, wherein the at least one further memory management module is arranged to:
   provide memory management functionality in relation to memory access transactions for which the at least one sideband signal matches the predefined parameter; and
   cause the memory management functionality provided thereby to be bypassed for memory access transactions for which the at least one sideband signal does not match the predefined parameter.

6. The memory management component of claim 1, wherein the memory management functionality provided by the at least one further memory management module to a received memory access transaction comprises determining whether a target address of the received memory access transaction corresponds to at least one predefined address range.

7. The memory management component of claim 6, wherein the at least one further memory management module comprises at least one memory element arranged to store there in parameters defining the at least one predefined address range.

8. The memory management component of claim 6, wherein the memory management functionality provided by the at least one further memory management module to a memory access transaction comprises generating an error interrupt if the target address of the received memory access transaction is not within the predefined address range.

9. The memory management component of claim 1, where the first memory management module is arranged to:
   compare at least one sideband signal corresponding to received memory access transactions to at least one predefined parameter to identify memory access transactions for which memory management functionality provided thereby is to be bypassed based at least partly on the comparison of the at least one sideband signal corresponding to the received memory access transactions to the at least one predefined parameter; and
   cause memory management functionality provided thereby to be bypassed for identified memory access transactions.

10. The memory management component of claim 9, wherein the at least one sideband signal which the first memory management module is arranged to compare to at least one predefined parameter comprises a context identifier signal corresponding to the received memory access transactions.

11. The memory management component of claim 9, wherein the first memory management module comprises at least a first memory element within which the at least one predefined parameter is stored.

12. The memory management component of claim 9, wherein the first memory management module is arranged to:
   provide memory management functionality in relation to memory access transactions for which the at least one sideband signal does not match the predefined parameter; and
   cause the memory management functionality provided thereby to be bypassed for memory access transactions for which the at least one sideband signal does matches the predefined parameter.

13. The memory management component of claim 12, wherein the first memory management module is arranged to use a page table within at least one secondary memory element for storing mapping information between at least one of:

virtual addresses and physical addresses;
virtual addresses and intermediate addresses; and
intermediate addresses and physical address.

14. The memory management component of claim 13, wherein the first memory management module comprises at least one translation lookaside buffer arranged to store therein a subset of page table entries.

15. The memory management component of claim 1, wherein the first and at least one further memory management modules are configured such that:
the first memory management module is arranged to provide memory management functionality for memory access transactions comprising sideband signals that do not match a predefined context parameter; and
the at least one further memory management module is arranged to provide memory management functionality for memory access transactions comprising sideband signals that match a predefined context parameter.

16. The memory management component of claim 15, wherein the at least one further memory management module is configured to provide memory management functionality for memory access transaction comprising sideband signals indicating a memory access transaction from a master device to a private area of memory of the master device.

17. The memory management component of claim 1 implemented within an integrated circuit device comprising at least one die within a single integrated circuit package.

18. A microprocessor comprising, at least one processing core and at least one memory management component according to claim 1.

19. A processing system, comprising a microprocessor as claimed in claim 18 and at least one memory element connected to the memory management component.

20. A method of providing memory management functionality within a processing system, the method comprising:
configuring a first memory management module arranged to provide memory management functionality for received memory access transactions in accordance with a paging memory management scheme to provide memory management functionality for memory access transactions comprising sideband signals that do not match a predefined context, wherein data is retrieved in same-size blocks;
configuring at least one further memory management module arranged to provide memory management functionality for received memory access transactions in accordance with an address range memory management scheme to provide memory management functionality for memory access transactions comprising sideband signals that match the predefined context, the at least one further memory management module coupled in series to the first memory management module to provide memory access transactions between a single master device and a memory, wherein the address range is for substantially any size memory area;
receiving a memory access transaction at the at least on further memory management module;
comparing a stream identifier for the received memory access transaction to a defined stream identifier;
bypassing the at least one further memory management module in response to a mismatch between the stream identifier and the defined stream identifier; and
forwarding the received memory access transaction to the first memory management module.

* * * * *